United States Patent
Kardach et al.

[11] Patent Number: 5,898,859
[45] Date of Patent: Apr. 27, 1999

[54] ADDRESS SHADOW FEATURE AND METHODS OF USING THE SAME

[75] Inventors: James P. Kardach, Saratoga; Tuong Trieu, Folsom, both of Calif.

[73] Assignee: Intel Corporation, Santa Clara, Calif.

[21] Appl. No.: 08/724,369

[22] Filed: Oct. 1, 1996

[51] Int. Cl.[6] .................................................. G06F 15/16
[52] U.S. Cl. .......................................... 395/500; 395/309
[58] Field of Search .................................. 395/500, 306, 395/307, 308, 309, 310; 364/578

[56] References Cited

U.S. PATENT DOCUMENTS

| | | | |
|---|---|---|---|
| 5,088,033 | 2/1992 | Binkley | 395/500 |
| 5,375,225 | 12/1994 | Dean | 395/500 |
| 5,564,026 | 10/1996 | Amini | 395/308 |
| 5,564,061 | 10/1996 | Davies | 395/884 |
| 5,590,312 | 12/1996 | Marisetty | 395/500 |
| 5,604,870 | 2/1997 | Moss | 395/280 |
| 5,644,754 | 7/1997 | Weber | 395/500 |
| 5,696,993 | 12/1997 | Gavish | 395/882 |
| 5,715,433 | 2/1998 | Raghavan | 395/500 |
| 5,721,880 | 2/1998 | McNeill | 395/500 |
| 5,727,217 | 3/1998 | Young | 395/733 |
| 5,748,945 | 5/1998 | Ng | 395/500 |
| 5,751,975 | 5/1998 | Gillespie | 395/306 |

FOREIGN PATENT DOCUMENTS 63-219294  9/1988  Japan ............................. G06F 15/16

*Primary Examiner*—Kevin J. Teska
*Assistant Examiner*—A. S. Roberts
*Attorney, Agent, or Firm*—Jeffrey S. Draeger

[57] ABSTRACT

An address shadow feature and methods of using the same. A slave controller of the present invention includes an address register coupled to receive a device address from a secondary bus interface. A match circuit is coupled to the address register and compares the device address to a shadow address, generating a match signal upon detection of a match between the shadow address and the device address. An interrupt generation circuit generates an interrupt signal in response to the match signal.

25 Claims, 5 Drawing Sheets

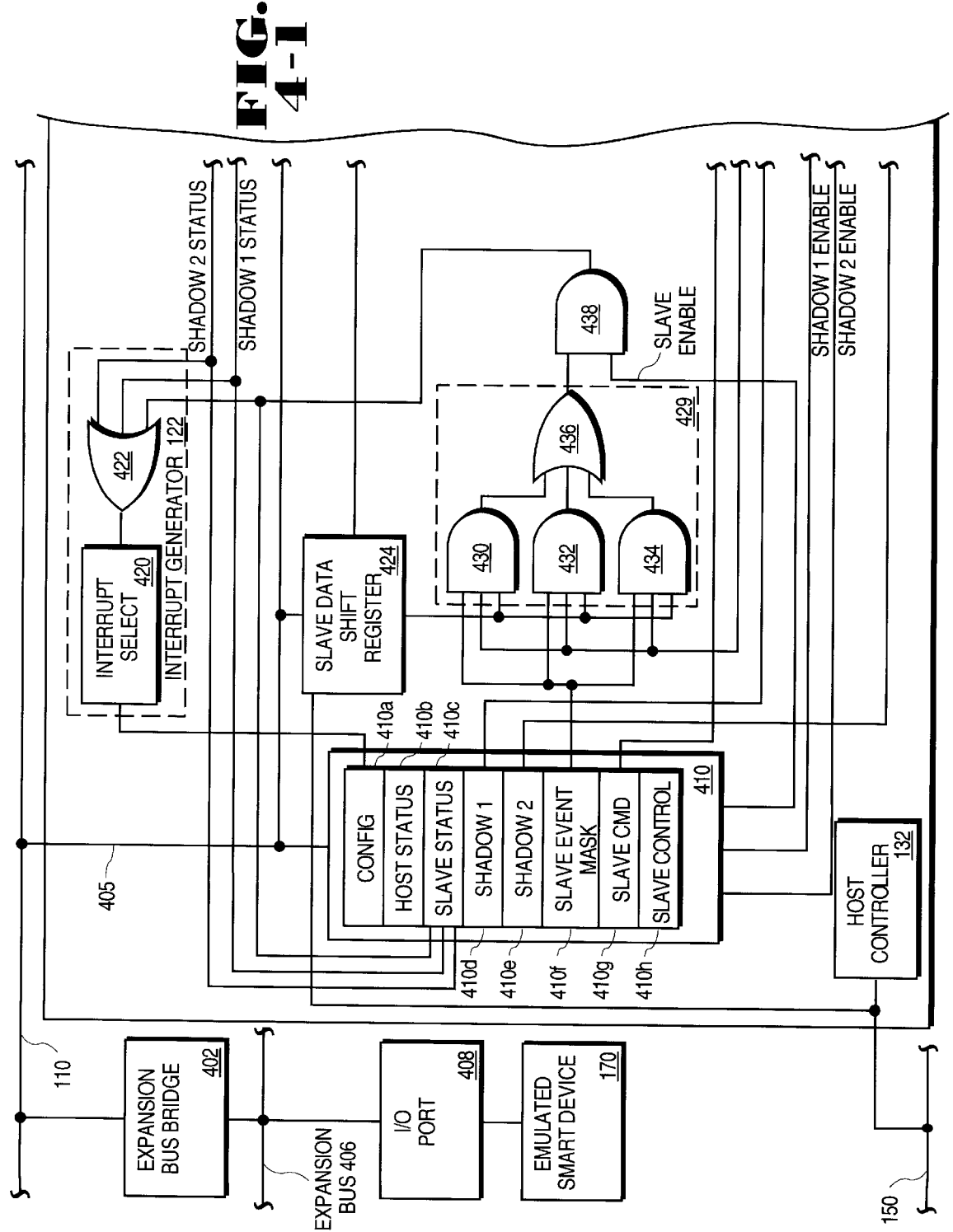

ADDRESS SHADOW FEATURE AND METHODS OF USING THE SAME

FIELD OF THE INVENTION

The present invention pertains to the field of emulating bus interface logic in a computer system. More specific ally, the present invention pertains to slave controllers having at least one shadow register to allow device emulation and/or system debugging.

BACKGROUND

Power management, intra-system communication, and many other peripheral functions in computer systems are often performed by serial and other secondary buses. Secondary buses generally include computer system buses, other than the main processor or system bus, which are often designed to accommodate a wide variety of secondary bus devices catered to particular user needs. As a result, it is advantageous for developers to have standardized interfaces which can accommodate many types of devices and system features.

Accordingly, bus protocols and compatibility requirements are often published in standard specifications, allowing widespread development of compatible devices. Such widespread development fosters the production of more interchangeable and compatible parts, ultimately benefiting consumers and allowing developers to confidently move forward with new products.

Widespread acceptance of a bus protocol also depends on the bus being flexible and having a robust feature set. Consequently, bus interfaces often sacrifice simplicity to improve the feature set and to allow future expansion. As a result, the overhead of implementing a compatible bus controller can be substantial for devices requiring only limited system interaction.

Numerous expansion and serial buses require non-trivial interfaces which represent significant overhead for certain bus agents. Some well known expansion buses include Industry Standard Association (ISA) and Extended Industry Standard Association (EISA) buses. Expansion buses typically provide a data, address, and control interface between a processor bus and the expansion bus. Some well known serial buses include the ACCESS bus and the System Management Bus (SMBus) which are based on a physical layer known as the Inter-Integrated Circuit ($I^2C$) Bus. Serial buses generally handle communication of system management information at a relatively low bandwidth.

In the serial bus environment, devices generally fall into the categories of master, slave, and host. A device which gains control of the bus and transmits information is a master device. A device receiving the transmitted information is referred to as a slave device. Each device may have both master and slave capabilities. A serial bus also typically has one host device which communicates with the computer system. This host device has an associated host slave port and host slave controller allowing the host device to receive commands from devices on the serial bus.

Expansion buses include master and slave devices; however, there is not typically a host device. Instead, a bus bridge typically transfers cycles between a system or processor bus and the expansion bus. Either type of system may suffer the shortcomings described herein.

The overhead of the logic required to interface with any one of these buses is most often problematic in slave devices which receive a small number of instructions. That is, where a slave device does not require elaborate control structures, the imposition of adding bus interface logic can be substantial. For example, a "smart" battery charger (i.e. one capable of interfacing with a computer system according to a particular bus protocol) situated on a SMBus typically only occasionally interacts with a smart battery or the computer system as power levels change. The system or the battery may request an increase or decrease in charging voltage or current due to voltage levels or battery temperature. For the charger, the bus control overhead can be significant since only a few power control signals are actually necessary to make such an adjustment.

In this simple slave device scenario, prior art host slave controllers fail to take advantage of already existing system hardware to simplify or eliminate other slave controller hardware. Such prior art devices either implement slave controller circuitry for each device or relegate that device to non-interaction with the bus. Additionally, prior art slave controllers fail to exploit a potential for debugging using the system processing power. This debugging cannot be done because the system lacks programmable registers which allow the capture and analysis of bus transactions.

In summary, some secondary bus devices incur significant overhead in complying with the appropriate bus protocol. These devices fail to utilize system processing resources which are already available and may adequately provide the necessary functionality. Consequently, situations are overlooked where emulation of bus interface logic using a computer system interface is more economical than designing a device compliant with the appropriate bus protocol.

SUMMARY

The present invention utilizes a shadow register in a slave controller for smart device emulation and/or debug using a computer system's processing resources. A slave controller of the present invention includes an address register coupled to receive a device address from a secondary bus interface. A matching circuit is coupled to the address register and compares the device address to a shadow address, generating a match signal upon detection of a match between the shadow address and the device address. An interrupt generation circuit generates an interrupt signal in response to the match signal.

BRIEF DESCRIPTION OF THE FIGURES

The present invention is illustrated by way of example and not limitation in the Figures of the accompanying drawings.

DETAILED DESCRIPTION

The present invention provides device shadowing capabilities for emulation and/or debugging. In the following description, numerous specific details such as particular bus protocols, signal names, and circuit level implementations are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included functional descriptions, will be able to implement the necessary logic circuits without undue experimentation.

The described methods and apparatus allow emulation of a slave device as well as secondary bus debugging capabilities. These techniques are generally applicable to a wide variety of buses, either serial or parallel, provided that a processor can be interrupted to execute either emulation or debugging routines. In the case where device emulation is performed, the emulated device may be entirely absent or may only require an emulated interface. Such emulation also typically necessitates a mechanism to provide at least one control signal to the emulated device.

Figure 1:
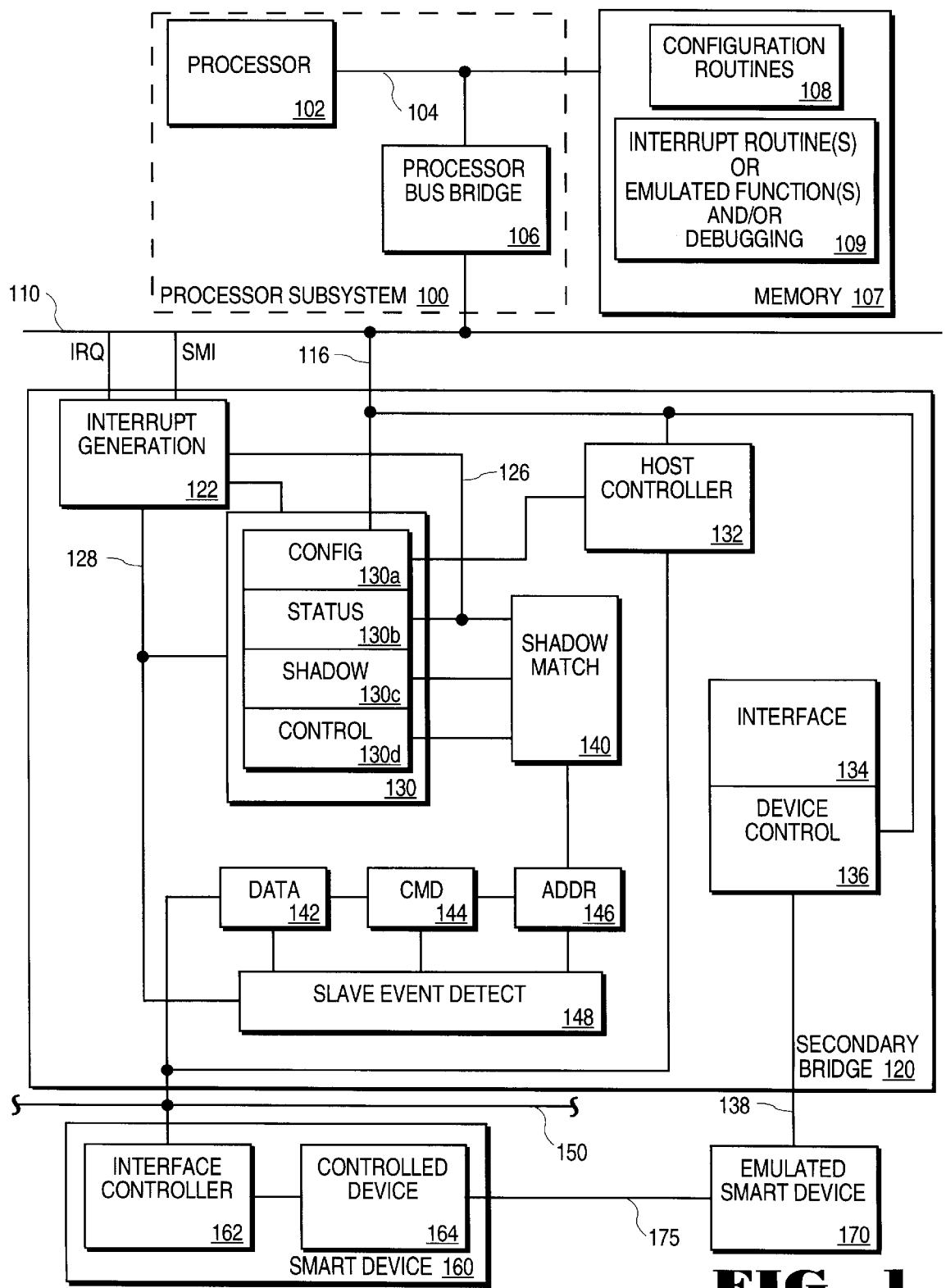
FIG. 1 illustrates one embodiment of a computer system of the present invention.

One embodiment of a computer system of the present invention is illustrated in FIG. 1. The computer system of FIG. 1 includes a central processor 102 coupled by a processor bus 104 to a processor bus bridge 106. The processor 102 and the processor bus bridge 106 form a processor subsystem 100 which interacts with a system bus 110 and a memory 107. The memory 107 contains configuration routines 108 and interrupt routines for emulated functions and/or debugging 109. Many other processor, memory, and system bus arrangements are well known and can be substituted for those shown.

A secondary bridge 120 couples the system bus 110 to a serial bus 150. A host controller 132 receives commands from the processor subsystem 100 intended for devices on the serial bus 150. The host controller 132 also has associated slave logic which allows devices attached to the serial bus 150 to communicate commands and/or data back to the processor subsystem.

The associated slave logic includes a slave data shift register 142, a slave command shift register 144, and a slave address shift register 146. In this embodiment, commands and addresses from the serial bus 150 are serially shifted through the data register 142 to the command register 144 and the address register 146. A slave event detect circuit 148 can be loaded with values from the system bus 110 to detect a coincidence of data, command, and address values, and to responsively assert a slave status line 128 to an interrupt generation circuit 122.

Thus, as done by prior art secondary bus bridges which include host and slave control logic, system commands are passed to the serial bus 150 by the host controller 132, and serial bus resume or interrupt events are detected by a slave event detect circuit 148. This allows a basic interface between the processor subsystem 100 and any device situated on the serial bus 150.

For example, a smart device 160 has an interface controller 162 which is coupled to receive commands from the host controller 132 through the serial bus. The interface controller 162 of the smart device 160 may sense data or conditions from a controlled device 164 and pass information back to the processor subsystem 100 through the data, command, and address registers 142, 144, and 146 of the secondary bridge 120.

An emulated smart device 170, however, is not attached to the serial bus 150 even though it would be advantageous for the smart device 160 to directly communicate with the emulated smart device 170. Accordingly, one intention of the present invention is to allow the emulated smart device 170 to appear as though it is coupled to the serial bus 150.

This allows a complex smart device to adhere to standardized interfacing protocols yet still seamlessly communicate with an emulated smart device 170.

This is accomplished by the cooperation of a shadow match circuit 140 with the interrupt generation circuit 122, the interrupt routines 109, and circuitry controlling a signal line 138 (which may comprise multiple conductors) coupled to the emulated smart device 170. Since signals asserted on the signal line 138 cause the emulated smart device 170 to respond appropriately to the command of the smart device 160, it appears as though the emulated smart device 170 resides on the serial bus 150.

Figure 2:
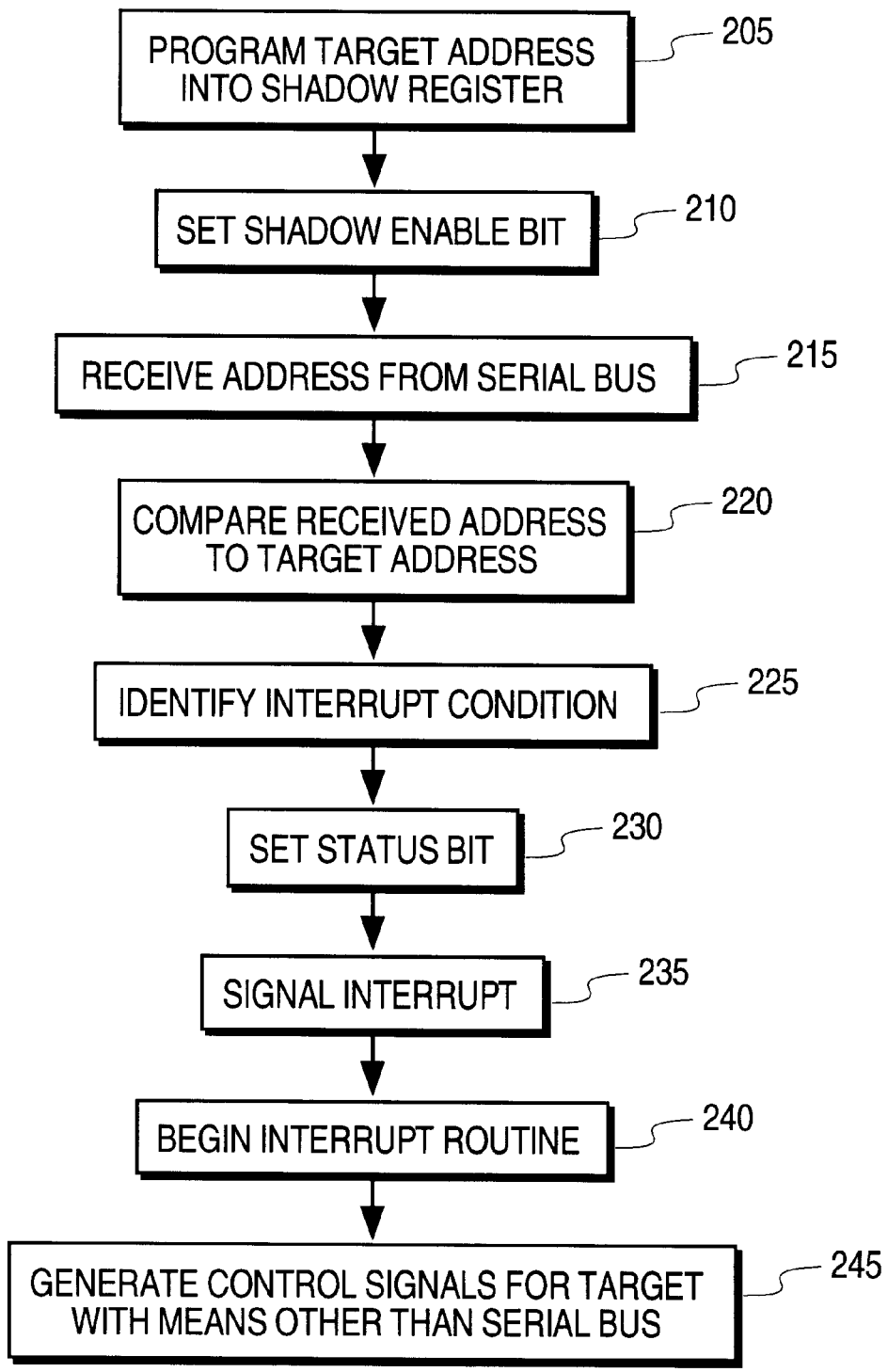
FIG. 2 is a flowchart illustrating a method of emulating a target device which may be used in the computer system of FIG. 1.

The sequence of events for emulating a smart device illustrated in the flow chart of FIG. 2 highlights the system interaction which occurs in the process of such emulation. First, in step 205, configuration routines 108 direct the processor to program a target address for the device to be emulated (emulated smart device 170) into a shadow register. In step 210, a shadow enabled bit in a control register 130D is set according to the configuration routines 108. The shadow enable bit of the control register 130D is coupled to the shadow match circuit 140, and programming this bit enables the shadow match feature.

Next, a device address generated by the smart device 160 is received from the serial bus 150. In this embodiment, data is received by the slave address shift register 146 after being serially shifted through the data register 142 and the command register 144. In other embodiments, the device address is coupled directly to an address register. In either case, step 215 is completed as the address is received from the serial bus.

The address register 146 is coupled to the shadow match circuit 140 such that in step 220 the shadow match circuit 140 can compare addresses and detect a correspondence between the received device address and the target address contained in the shadow register. Preferably, an exact address match is used such that one device is emulated per shadow register; however, other embodiments allow equivalence between a limited number of bits or a correspondence indicated by opposite signal polarities.

Finding the requisite correspondence between the target address stored in the shadow register and the received device address results in the identification of an interrupt condition as shown in step 225. As a result, a shadow status bit in a status register 130B is set in step 230 and the shadow status signal is coupled by a control line 126 to the interrupt generation circuit 122.

The interrupt generation circuit 122 receives the shadow status bit as well as a slave status bit from the slave event detect circuit 148. The interrupt generation circuit also receives at least one interrupt select bit programmed by the configuration routines 108 into a configuration register 130A which is one of a plurality of registers 130 coupled via a parallel interface 116 to the system bus 110. Depending on the interrupt select bit, the interrupt generation circuit 122 signals either a system management interrupt (SMI) or an interrupt request (IRQ) to the processor subsystem 100, thus completing step 235. In one embodiment, the slave control logic does not accept further data from the serial bus 150 until the interrupt has been serviced.

In step 240, the processor 102 begins execution of one of the interrupt routines 109. The interrupt routine reads the status register 130B and thereby determines that a shadow match has occurred. The processor 102 then may read the command register 144 and the data register 142 to ascertain the action requested by the smart device 160.

The requested action is then performed by an emulation routine which uses an alternate control mechanism (as opposed to the serial bus 150) to control the emulated smart device 170. In this embodiment, interface logic 134 and a device control register 136 accessible via the system bus 110 and integrated within the secondary bridge 120 form the alternate control mechanism. This interface circuitry generates control signals for the target, the emulated smart device 170, thereby completing the step 245.

Other embodiments of the alternate control mechanism include any discrete or integrated logic circuit which generates control signals in response to a system I/O or other system address access. Essentially, any existing or newly added mechanism which can provide at least one control signal to an emulated smart device under the control of interrupt service routines may be used as the alternate control mechanism.

In one specific embodiment of the computer system of FIG. 1, the serial bus 150 is a SMBus, the smart device 160 is a smart battery, and the emulated smart device 170 is a battery charger which allows current and voltage control. Since the battery is a smart device, it could send commands directly to a smart battery charger if one were coupled to the serial bus 150.

The present invention allows the smart battery to send commands directly addressed to such a smart battery charger even though no such device is directly coupled to the serial bus 150. Instead the computer system emulates the smart battery charger interface, allowing the system to include smart battery technology while not requiring a smart battery charger.

A smart battery in a system configured as illustrated may inform the computer system that some resources can be enabled as the battery charge increases. To do so, the smart battery sends the slave controller address along with appropriate command and data items on the serial bus. The slave event detect circuit 148 recognizes these bits captured in the data, command, and address registers 142, 144, and 146, and generates a slave status signal in response. This signal in turn, causes the interrupt generation circuit 122 to generate an SMI interrupt to the processor subsystem 100, which subsequently executes an appropriate interrupt service routine.

The smart battery may also wish to communicate with the battery charger when the battery charge increases. Again, the smart battery couples a command with the address of the smart battery charger to the serial bus. This command is received by the data, command, and address registers 142, 144, and 146, as are all commands placed on the serial bus 150. In this case, however, the slave event detect circuit 148 does not detect a matching address, but instead the shadow match circuit 140 detects a match between the received address in the address register 146 and a battery charger address (typically eleven hexadecimal) stored in the shadow register. In this case, a shadow status signal generated by the, shadow match circuit 140 updates the status register 130B and causes the interrupt generation circuit 122 to assert an SMI interrupt to the processor subsystem 100.

Interrupt service routines for the emulated smart battery charger interpret the command from the smart battery and send appropriate control signals to the emulated smart battery via the interface logic 134 and the device control register 136. Accordingly, the smart battery can send commands to increase or decrease voltage or current levels on a power line 175 as if the battery charger was a smart battery charger coupled to the serial bus 150. Since existing registers of the slave controller provide the bus monitoring capability for device emulation, this combination is significantly more economical than duplicating such logic in a slave device.

Figure 3:
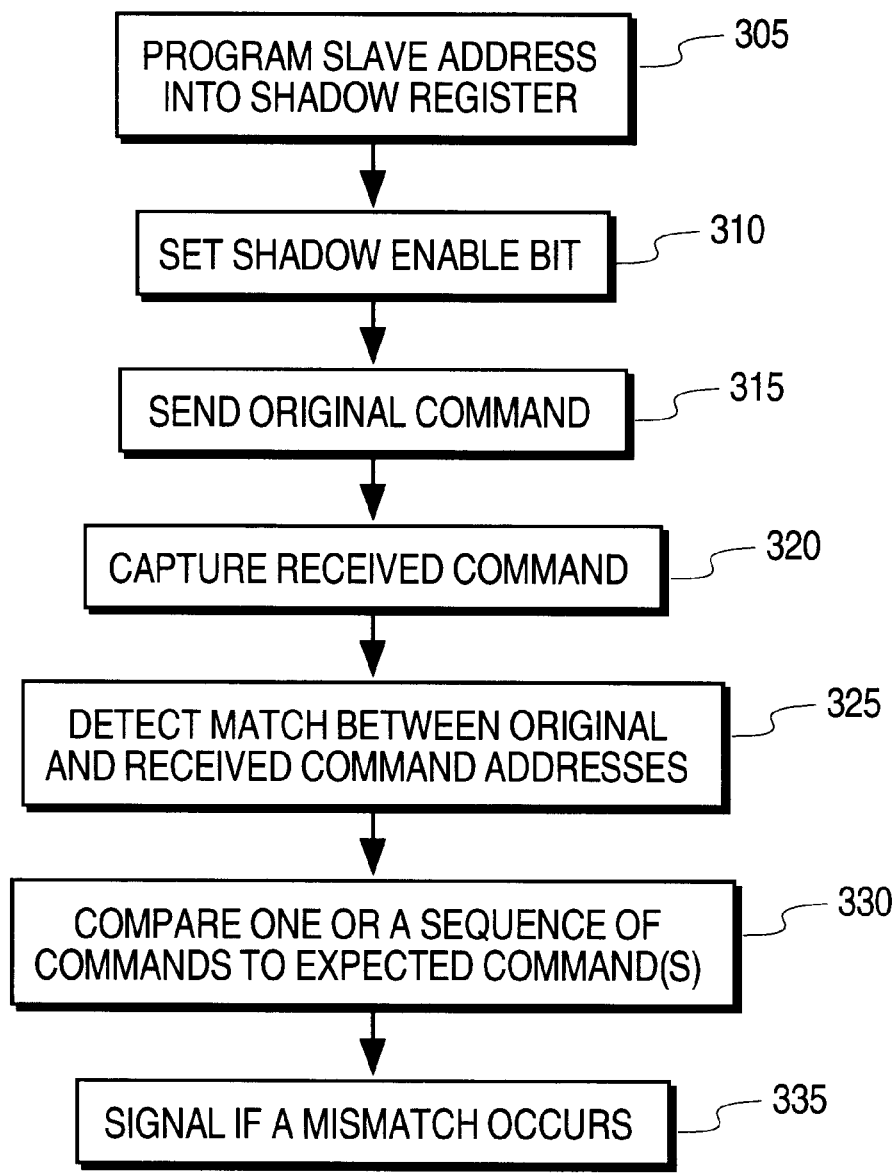
FIG. 3 is a flow chart illustrating a method of debugging which may also be used in the computer system of FIG. 1.

In addition to this type of emulation of smart devices, the present invention provides debugging capabilities for buses such as the serial bus 150. FIG. 3 illustrates one method of using the shadow register and the shadow match circuit 140 to debug problems with serial bus devices, the serial bus host controller or with the connectivity of the serial bus itself. Whenever a problem may occur associated with the serial bus, either incorrect bit sequences are received by devices, or devices receiving the proper bit sequences do not properly respond. Either case can be detected using the illustrated method.

In step 305, a slave address is programmed into the shadow register. The slave address may be the slave address for the host slave controller or any device on the serial bus 150 which is to be tested. Next, the shadow enable bit is set in step 310, enabling the shadow match feature.

An original command is sent out by the host controller 132 in step 315. This command may have a destination of the host slave controller or any slave controller attached to the serial bus 150; however, the shadow register should be programmed with the same destination address as the command. In step 320, the command generated by the host controller is received by not only the host controller slave logic, but also by any other slave control device on the serial bus.

In step 325, the shadow match circuit 140 detects a match between the addresses of the original and the received commands by comparing the address register 146 to the shadow register. If no match occurs where a match was expected, this signifies one type of error the debugging process can detect. If there is a match, other portions of the received command may be incorrect. That is, the received data or received command may not be equivalent to the original data and original command sent out by the host controller 132. Since the data register 142 and the command register 144 can be loaded by the processor subsystem, these values can be inspected by interrupt routines executed in response to the shadow match which occurred.

Such routines can either individually compare each command and/or data received over the serial bus, or may accumulate a series of commands and data and store them in the memory 107. Ultimately, each command or a sequence of commands are compared to detect a mismatch with a set of expected commands as shown in step 330. If a mismatch occurs, this mismatch is signaled to the user in step 335.

Notably, original commands could be sent by other masters on serial bus 150 such as the smart device 160. In any case, when the shadow register is programmed to shadow a particular device, all accesses to that device via the serial bus 150 will be trapped.

Figures 2, 4:
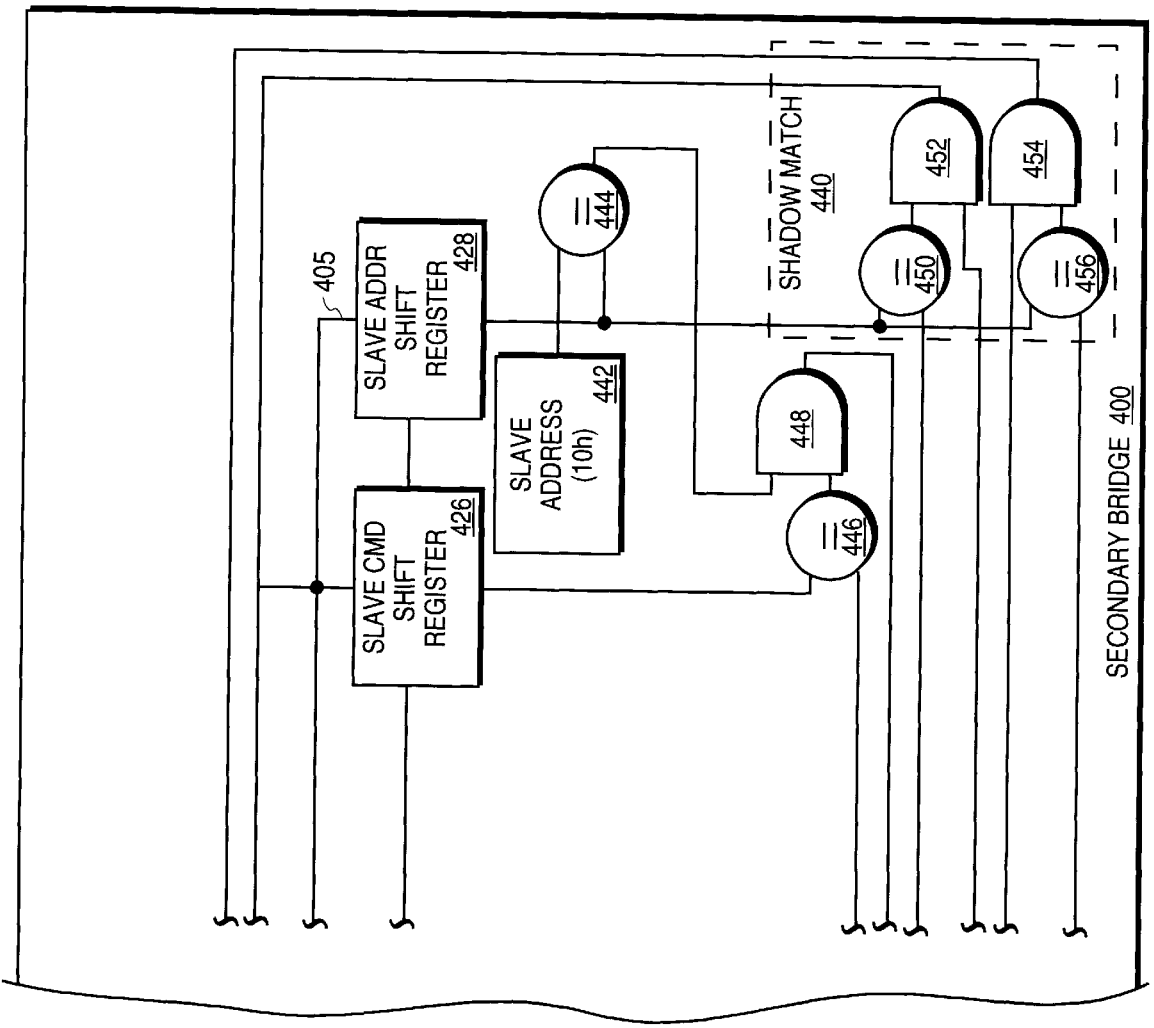
FIG. 4 illustrates further details of one embodiment of a portion of a computer system of the present invention.

Additionally, if an address mismatch occurs in step 325 where a match was expected, it may be unnecessary to perform the command comparison of step 330. In this case, the mismatch is signaled because the address register 146 captured an unexpected address. Thus, these steps allow detection of whether proper data, commands and addresses are being driven to the serial bus. Mismatches can indicate problems with slave devices, master devices, a host device, or the bus itself. These and other methods are enabled by the combination of shadow match circuitry, interrupt generation circuitry, and in the case of emulation, interfacing circuitry for the emulated device. FIG. 4 illustrates details of one embodiment of these and various other circuits.

In the embodiment of FIG. 4, a secondary bridge 400 couples the system bus 110 to the serial bus 150. The host controller 132 receives commands from the system bus and returns information through interrupt signals and a number of registers including a host status register 410B. Data sequences are received from the serial bus 150 by a slave data shift register 424, a slave command shift register 426, and a slave address shift register 428. These registers are also accessible by a parallel interface 405 to the system bus 110.

A slave address match circuit 444 compares a slave address 442 to the contents of the slave address shift register 428. In one embodiment, the slave address 442 is permanently fixed at ten hexadecimal. In alternate embodiments, the slave address 442 is hardwired into logic or stored in a volatile or nonvolatile memory. In a similar manner, a slave command match circuit 446 compares a slave command signal to the contents of the slave command shift register 426. The slave command signal is stored in a slave command register 410G which is one of the plurality of registers 410 which are accessible by the system bus 110.

A data mask circuit 429 detects events indicated by bits of the slave data shift register 424 which are enabled by a slave event mask register 410F. Each bit of the slave data shift register 424 and a corresponding bit of the slave event mask register 410F are coupled to inputs of AND gates such as AND gates 430,432, and 434. The output of each AND gate is coupled to an input of an OR gate 436, the output of which is asserted if any enabled events are indicated by the contents of the slave data shift register 424.

Collectively, the slave address match circuit 444, the slave command match circuit 446 and the data mask circuit 429 are coupled to form a slave event detect circuit. The output of the slave address match circuit 444 is coupled to an input of an AND gate 448 which also receives the output of the slave command match circuit 446. An output of the AND gate 448 is coupled to a third input of the AND gates 430, 432, and 434. As a result, the output of the OR gate 436 will not be asserted unless a slave address match occurs, a slave command match occurs, and the slave data shift register 424 indicates an enabled event.

In addition, a slave enable bit of a slave control register 410H is coupled to an input of an AND gate 438 which also receives the output of the OR gate 436. This ensures that the slave status register 410C will not be updated, and the interrupt generation circuit 122 will not be signaled unless slave event detection has been enabled by setting the proper bit in the slave control register 410H.

The shadow match circuit 440 of this embodiment includes a first comparison circuit 450 coupled to compare the contents of the slave address shift register 428 to the contents of a first shadow register 410D. A second comparison circuit 456 compares the contents of the slave address shift register 428 to the contents of a second shadow register 410E. The output of the first comparison circuit 450 is masked by a first shadow enable signal from the slave control register 410H by an AND gate 452. Similarly, the output of the second comparison circuit 456 is masked by a second shadow enable signal from the slave control register 410H by an AND gate 454. These AND gates 452 and 454 respectively generate a first shadow status signal and a second shadow status signal, both of which are coupled to the interrupt generation circuit 122 and the slave status register 410C.

In this embodiment, the interrupt generation circuit 122 performs a logical OR of the first shadow status signal, the second shadow signal, and the slave status signal using an OR gate 422. If any of these status signals are asserted, the interrupt generation responsively generates an interrupt signal to be selected by an interrupt select circuit 420. The interrupt select circuit 420 chooses an interrupt signal to assert based on a value written to a configuration register 410A during an initialization process.

As discussed with respect to FIGS. 1–3 an appropriate interrupt service routine is run in response to the interrupt signal generated by the interrupt generation circuit 122. In this embodiment, an I/O port 408 coupled by an expansion bus 406 and an expansion bus bridge 402 to the system bus 110 allows emulation routines to write to the I/O port 408 thereby generating control signals for the emulated smart device 170. Accordingly, the emulated smart device 170 is accessed without using the serial bus 150.

Thus, the shadow match circuitry and other associated components of the present invention allow device emulation and system debugging. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A slave controller having slave device shadowing capabilities, the slave controller comprising:
an address register coupled to receive a device address from a secondary bus interface;
a match circuit coupled to the address register to compare the device address to a shadow address and to generate a match signal upon detection of a shadow address match;
an interrupt generation circuit coupled to receive the match signal and responsively generate an interrupt signal to interrupt a central processor.

2. The slave controller of claim 1 further comprising:
a first programmable register coupled to receive the shadow address from a parallel bus interface.

3. The slave controller of claim 2 further comprising:
a slave control register having a first enable bit coupled to enable the match circuit.

4. The slave controller of claim 3 further comprising:
a slave status register coupled to receive the match signal and coupled to the parallel bus interface.

5. The slave controller of claim 1 wherein the interrupt generation circuit comprises:
a logical or circuit coupled to receive a plurality of interrupt generating signals, the match signal being one of the plurality of interrupt generating signals; and
a selection circuit coupled to a configuration register, the selection circuit selecting an interrupt according to the configuration register in response to an assertion of one of the plurality of interrupt generating signals.

6. The slave controller of claim 2 further comprising:
a data register coupled to receive a data item from the secondary bus interface; and
a command register coupled to receive a command item from the secondary bus interface.

7. The slave controller of claim 6 further comprising:
a slave event detect circuit coupled to the address register, the command register, and the data register, the slave event detect circuit having a slave event output coupled to the interrupt generation circuit.

8. The slave controller of claim 7 wherein the slave event detect circuit comprises:

a slave address match circuit coupled to the address register and coupled to assert a slave address match signal upon detection of a slave address match;

a command match circuit coupled to the command register and coupled to receive a slave command signal, the command match circuit being coupled to generate a slave command match signal in response to assertion of the slave address match signal and detection of a slave command match;

a data mask circuit coupled to the data register and to an event enable signal, the data mask circuit being coupled to assert a slave event signal to the interrupt generation circuit in response to the slave command match signal being active when the data register indicates an event which is enabled by the event enable signal.

9. The slave controller of claim 8 further comprising:

a slave command register coupled to receive the slave command signal from the parallel bus interface;

a slave event enable register coupled to receive the slave event enable signal from the parallel bus interface.

10. The slave controller of claim 9 wherein the bus is a serial bus, the command register is coupled to receive the command item serially shifted through the data register, and the address register is coupled to receive the device address serially through the data register and the command register.

11. A computer system comprising:

a processor;

a system bus coupled to the processor;

a secondary bus bridge coupling the system bus to a secondary bus, the secondary bus bridge comprising:

a slave address register coupled to receive a target address from the secondary bus;

a shadow match circuit coupled to the slave address register and having a shadow match output to indicate a correspondence between the target address and a shadow device address;

an interrupt generation circuit receivingly coupled to the shadow match output and having an interrupt output coupled to the processor;

a memory coupled to the processor, the memory containing an interrupt service routine for execution by the processor which directs generation of at least one target device control signal.

12. The computer system of claim 11 wherein the secondary bus bridge further comprises:

a shadow device address register coupled to receive the shadow device address from the processor.

13. The computer system of claim 11 further comprising:

a smart device coupled to generate the target address and a target command on the secondary bus;

a target device coupled to receive the at least one target device control signal generated by the processor.

14. The computer system of claim 13 wherein the at least one target device control signal conveys the target command to the target device via an alternate control means.

15. The computer system of claim 13 wherein the smart device is a smart battery, the target device is a battery charger coupled to the processor by an interface circuit, and the interrupt service routines address the interface circuit to assert the at least one control signal to control power output of the battery charger.

16. A method of emulating a target device on a secondary bus in a computer system, the method comprising:

programming a target address for the target device into a slave controller shadow register using a system bus;

receiving a command address over the secondary bus;

comparing the target address to the command address; and executing an interrupt service routine on a central processor to emulate the target device if the command address equals the target address.

17. The method of claim 16, before the step of receiving, further comprising the step of:

programming a shadow enable bit using the system bus.

18. The method of claim 16 wherein the step of executing further comprises the step of generating control signals for the target device using means other than the secondary bus.

19. The method of claim 16 wherein the step of comparing further comprises setting a status bit to identify an interrupt event if the target address equals the command address, and the step of executing further comprises reading the status bit to identify the interrupt event, and generating control signals for the target device.

20. The method of claim 19 wherein the target device is a battery charger, the command requests a change in battery charging, and wherein the step of executing an emulation routine further comprises the steps of:

programming at least one bit on an interface device.

21. The method of claim 20 wherein the step of programming further comprises the step of:

writing to a system I/O port.

22. The method of claim 20 wherein the step of programming further comprises the step of:

sending a second command to a microcontroller to set a bit controlling the battery charger.

23. A method of debugging a secondary bus having a host device communicating with a slave device which has a slave address, the method comprising:

programming a shadow register with the slave address;

sending an original command having an original command address over a bus;

capturing a received command from the bus;

detecting a match between the slave address contained in the shadow register and the original command address; and detecting errors in the received command.

24. The method of claim 23 wherein the step of detecting further comprises the step of:

comparing the received command to the original command.

25. The method of claim 23 wherein the step of detecting further comprises the steps of:

tracing a sequence of commands on the secondary bus; and comparing the sequence of commands to an expected sequence of commands.

* * * * *

UNITED STATES PATENT AND TRADEMARK OFFICE
CERTIFICATE OF CORRECTION

PATENT NO. : 5,898,859
DATED : April 27, 1999
INVENTOR(S) : Kardach et al.

It is certified that error appears in the above-identified patent and that said Letters Patent is hereby corrected as shown below:

Column 1,
Line 44, delete "ACCESS bus" and insert -- ACCESS.bus --.

Signed and Sealed this

Twenty-ninth Day of June, 2004

JON W. DUDAS
*Acting Director of the United States Patent and Trademark Office*